H. H. SCHERFF.
TIRE CARRIER.
APPLICATION FILED NOV. 30, 1917.
1,321,794.
Patented Nov. 11, 1919.
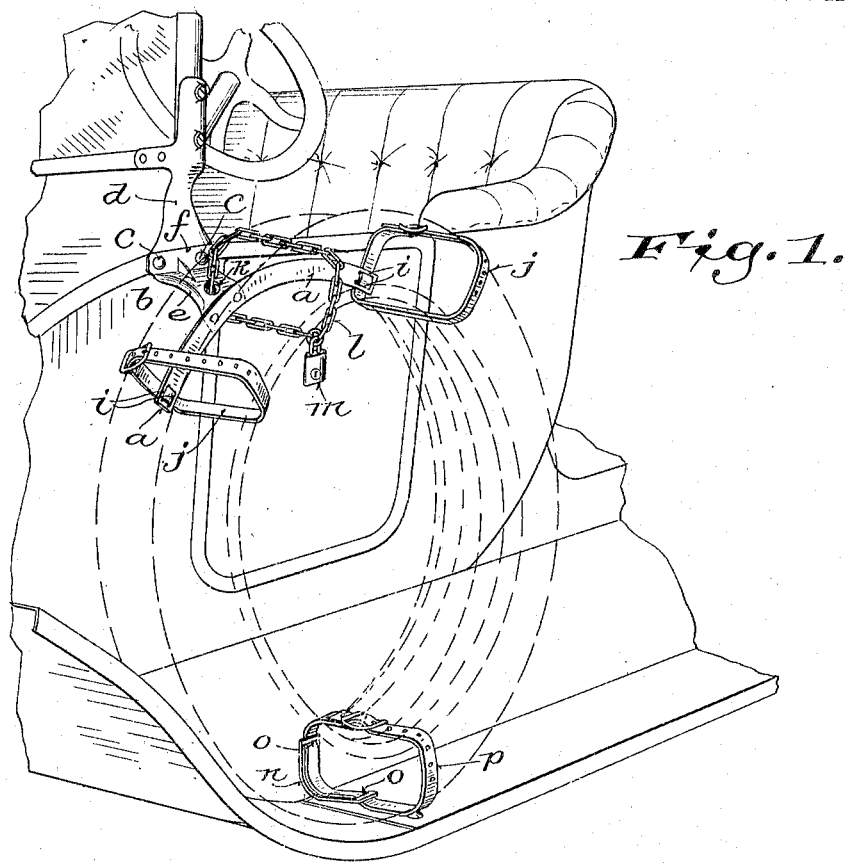
Fig. 1.
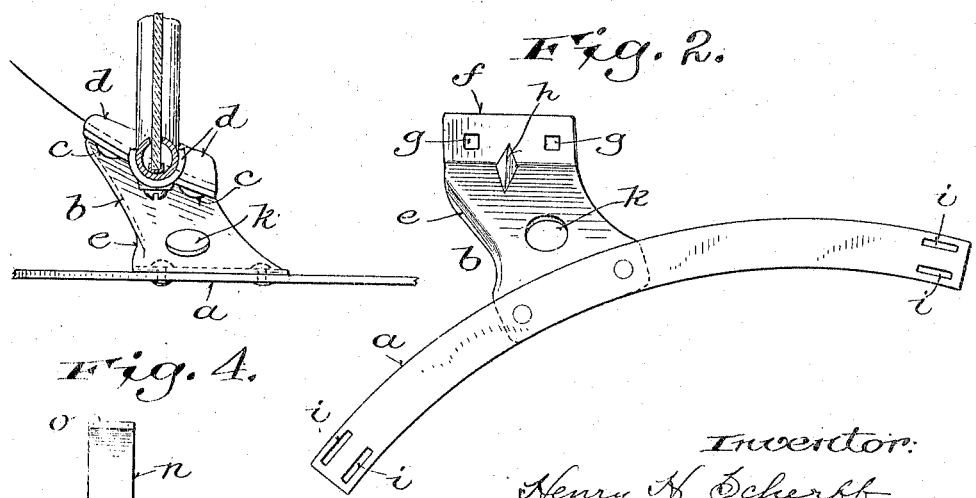
Fig. 3.   Fig. 2.
Fig. 4.
Inventor:
Henry H. Scherff,
By Bottum Bottum Hudnall Lecher
Attorneys.

UNITED STATES PATENT OFFICE.

HENRY H. SCHERFF, OF MILWAUKEE, WISCONSIN, ASSIGNOR TO AMERICAN METAL PARTS CO., OF MILWAUKEE, WISCONSIN, A CORPORATION OF WISCONSIN.

TIRE-CARRIER.

1,321,794.     Specification of Letters Patent.     Patented Nov. 11, 1919.

Application filed November 30, 1917. Serial No. 204,499.

*To all whom it may concern:*

Be it known that I, HENRY H. SCHERFF, a citizen of the United States, residing at Milwaukee, in the county of Milwaukee and State of Wisconsin, have invented certain new and useful Improvements in Tire-Carriers, of which the following is a specification, reference being had to the accompanying drawing, forming a part thereof.

The main objects of this invention are to provide a simple, light and inconspicuous spare tire carrier, which can be easily and quickly applied without special tools to automobiles, particularly Ford cars, and which will firmly support one or more tires either inflated or deflated, and either with or without rims, and securely hold them in proper shape and condition for immediate use; to prevent spare tires from scratching or defacing the cars on which they are carried; to support the tires in clear view of the driver or occupants of a car, where they are protected from exhaust gases or splashing mud and are less liable to be abstracted or meddled with; to relieve the running boards of cars from the weight of the spare tires and the strain and vibration incident thereto; to support and secure the tires in place in such a way as to avoid chafing and injuring them; and generally to simplify and improve the construction of spare tire carriers or holders of this class.

It consists in the construction, arrangement and combination of parts as hereinafter particularly described and pointed out in the claims.

In the accompanying drawing like characters designate the same parts in the several figures.

Figure 1 is a perspective view of a complete tire carrier embodying the invention as applied to a Ford runabout car, a part of which is shown, two spare tires being indicated by dotted lines as secured in place to the carrier; Fig. 2 is an enlarged front elevation of the upper and main member of the carrier; Fig. 3 is a plan view of a portion of the upper member and a wind shield bracket to which it is attached, a part of the wind shield being shown in horizontal section; and Fig. 4 is an enlarged plan view of the lower member of the carrier, which is designed to be fastened to the running board of a car.

The carrier comprises an upper and main member, consisting of an arcuate metal band *a*, and a metal bracket *b*, riveted or otherwise attached to the band approximately midway between its ends and adapted to be rigidly secured to a car by the same bolts *c*, which fasten one of the wind shield brackets *d* to the body of the car. The band *a* which may be made from a flat metal band of sufficient thickness and rigidity to firmly support one or more tires secured to its outer flat face, is curved vertically or edgewise to correspond with the curvature of the tires it is designed to support.

While the metal band *a* is substantially rigid or inflexible edgewise or in a vertical plane, it is sufficiently flexible flatwise or laterally, to readily conform to the tire or tires fastened to its ends, particularly when the tires are inflated or provided with rims, and are thus rendered comparatively inflexible.

The bracket *b*, which as shown, may be stamped from heavy sheet metal with a stiffening flange *e* on one or each of its sides, extends inwardly and upwardly from the curved band *a*, and is formed at the rear or inner end with an upwardly bent flange *f* in a plane substantially parallel with the band *a*. The flange *f* which is fitted to the outer side of the adjacent wind shield bracket *d* next to its lower end, is formed with bolt holes *g*, as shown in Fig. 2, spaced to correspond with the bolt holes in the wind shield bracket and to receive the bolts *c*, by which said bracket is fastened to the body of the car. At the angle between the body of the bracket *b* and its flange *f*, a transverse rib *h* is formed, to stiffen and strengthen the bracket where it is most liable to break or bend.

Adjacent to each end, the band *a* is formed as shown in Fig. 2, with two parallel longitudinal slots *i*, through which a strap *j* is looped or passed for fastening a tire or tires firmly to and against the outer plane vertical face of said band, as indicated in Fig. 1, the back side of a single tire or of the inner or rear tire when there are two or more, resting against and being firmly supported by said band.

Between the band $a$ and the attachment flange $f$, the bracket $b$ is formed with a hole $k$ for a chain $l$, which is passed around the band $a$ and the tire or tires supported thereby, and is fastened at the ends by a lock $m$, as shown in Fig. 1, when it is desired to prevent unauthorized removal of the tires from the carrier.

The lower member of the carrier consists, as shown in Figs. 1 and 4, of a flat metal band, bent approximately into L-shape, and formed adjacent to the ends with transverse slots $o$, to receive a strap $p$ for confining a tire or tires in place on the lower side next to the running board, as shown in Fig. 1.

The horizontal limb of the lower member or band $n$ is formed as shown in Fig. 4, with a bolt hole $q$, for fastening it to the running board by one of the bolts which are used for fastening the running board to the car. Thus it is not necessary to bore or drill any holes in the car, or provide bolts for the attachment of the tire carrier, the bolts with which a car is already supplied for attaching the wind shield and running board to the body being utilized for the attachment of the tire carrier.

The strap $p$ passing over the metal band $n$, and the bolt head by which it is fastened to the running board, comes in contact with the tire or tires supported by the carrier, and prevents their being chafed or injured by the band or bolt head.

A tire or tires being tightly fastened by the straps $j$ to the curved band $a$, are mainly and firmly supported thereby, thus relieving the running board from strain and vibration due to their weight. As the tires are confined at three separate points by the flexible and pliable straps $j$ and $p$, which readily conform thereto, they are prevented from sagging or swaying, and are firmly held in proper shape and condition for immediate use when required. With the exception of the straps, the carrier is concealed from the outside when a tire or tires are fastened thereto, and when they are removed it is unnoticeable or inconspicuous.

The carrier supporting the tires in an upright position at one side of the car in clear view of the driver or occupants of the car, are not as liable to be stolen or tampered with, as when they are carried as usual at the back of the car, and they are not subjected to the injurious effects of exhaust gases from the engine, and of splashing mud, against which they are protected by the running board and front wheel fender.

I claim:

1. A tire carrier comprising a substantially flat arcuate band curved edgewise to correspond with the tires to be supported thereby and provided at the ends with fastenings for detachably securing tires thereto and between its ends with a backwardly projecting bracket adapted to be fastened to a car and to support the band and tires attached thereto in a substantially vertical plane.

2. A tire carrier comprising an arcuate metal band corresponding in curvature with the curvature of tires to be supported thereby, having a flat outer tire-supporting face and provided at the ends with parallel longitudinal slots, straps looped through said slots for fastening one or more tires in an upright position against the outer flat face of the band, and a backwardly extending metal bracket attached to the band approximately midway between its ends and adapted to be fastened to a car to firmly support the band with its outer face in a substantially vertical plane.

3. A tire carrier comprising an upper arcuate tire-supporting band having a flat outer face and provided at the ends with fastenings for securing one or more tires against its outer face and approximately midway between its ends with an inwardly and upwardly projecting bracket having bolt holes registering with the bolt holes in the wind shield bracket with which it is adapted to be bolted to a car, and a lower L-shaped tire-supporting band formed adjacent to its ends with transverse strap slots and with a bolt hole for securing it to the running board of a car.

4. A tire carrier comprising an arcuate band having a substantially flat outer vertical tire-supporting face and formed at each end with longitudinal strap slots, an inwardly projecting bracket attached to the band approximately midway between its ends for fastening it to a car and formed with a hole, and a chain adapted to be passed through said hole around the band and one or more tires and locked to prevent unauthorized removal of the tires.

In witness whereof I hereto affix my signature.

HENRY H. SCHERFF.

Copies of this patent may be obtained for five cents each, by addressing the "Commissioner of Patents, Washington, D. C."